(12) United States Patent
Tung et al.

(10) Patent No.: US 7,248,650 B1
(45) Date of Patent: Jul. 24, 2007

(54) HARDWARE IMPLEMENTATION OF MAXIMUM LIKELIHOOD SEQUENCE ESTIMATION FOR WIRELESS RECEIVERS

(75) Inventors: Chien-Cheng Tung, Fremont, CA (US); Julian Chih Liang Chang, Milpitas, CA (US)

(73) Assignee: Ralink Technology, Inc., Cupertino, CA (US)

( * ) Notice: Subject to any disclaimer, the term of this patent is extended or adjusted under 35 U.S.C. 154(b) by 744 days.

(21) Appl. No.: 10/454,883

(22) Filed: Jun. 4, 2003

Related U.S. Application Data

(60) Provisional application No. 60/396,528, filed on Jul. 16, 2002.

(51) Int. Cl.
*H03D 1/00* (2006.01)
(52) U.S. Cl. .................................... 375/341; 714/794
(58) Field of Classification Search ................ 375/265, 375/233, 350, 341; 714/794, 795
See application file for complete search history.

(56) References Cited

U.S. PATENT DOCUMENTS 6,035,007 A * 3/2000 Khayrallah et al. ......... 375/341

2003/0033574 A1 * 2/2003 Vasic ......................... 714/795

* cited by examiner

*Primary Examiner*—Kevin Kim
(74) *Attorney, Agent, or Firm*—Law Offices of Imam

(57) ABSTRACT

A coding/decoding trellis structure circuit included in a maximum likelihood sequence estimator (MLSE) sub-receiver having one or more distance calculation units (distus) responsive to equalized data generated by said MLSE sub-receiver from wireless transmission of transmitted data, said distu further responsive to MLSE codewords for processing the same, said equalized data including one or more equalized data chips and each of said MLSE codewords including one or more MLSE codeword chips, each of said distus for processing an equalized data chip and an MLSE codeword chip to generate a chip output, said distu for using said chip output to generate distance measures, a distance measure being the distance between said equalized data and said MLSE codeword, in accordance with an embodiment of the present invention. The coding/decoding trellis structure circuit further including one or more accumulator devices responsive to said chip output and said distance measures for storing the same for use by said one or more distus. The coding/decoding trellis structure circuit further including one or more comparator devices responsive to said chip output and said distance measures for processing the same to generate a decoded equalized data, said MLSE sub-receiver using said decoded equalized data to generate a decoded transmitted data.

13 Claims, 12 Drawing Sheets

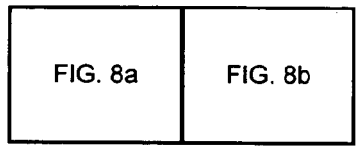
*FIG. 8*
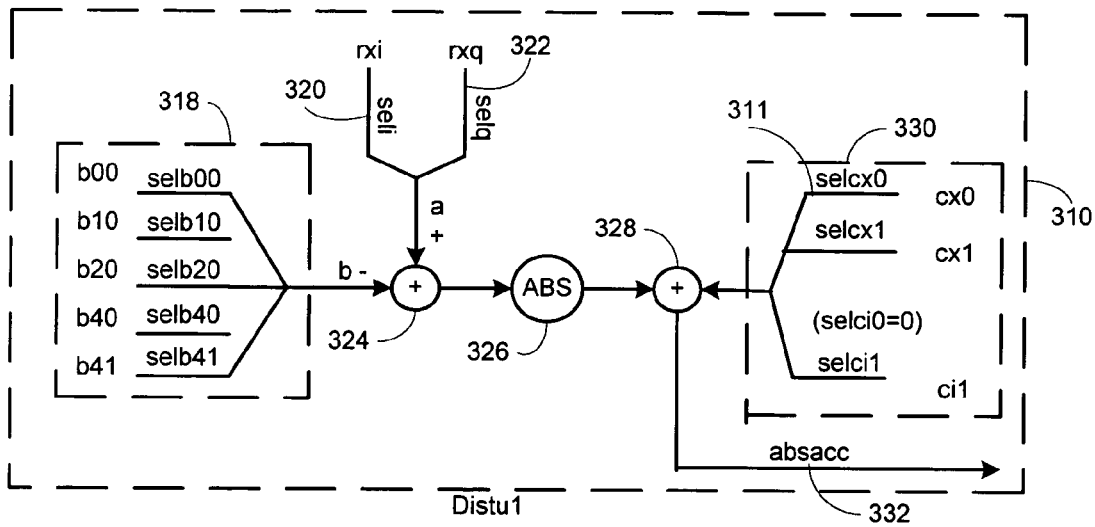
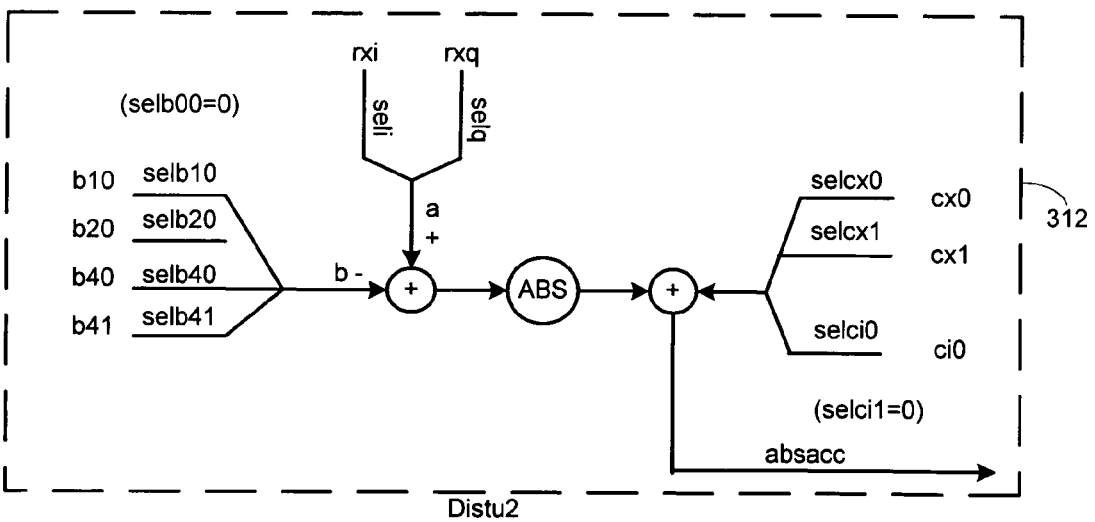
*FIG. 8a*

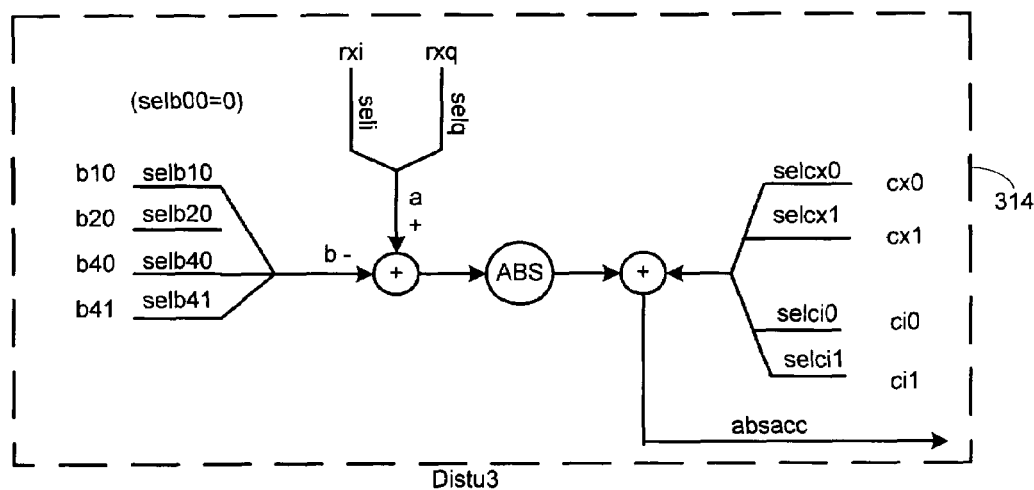
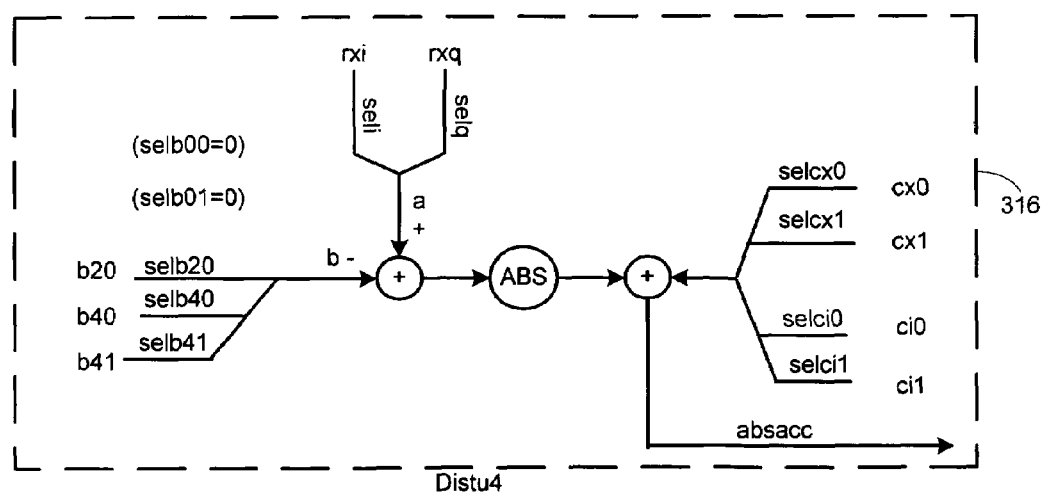
FIG. 8b

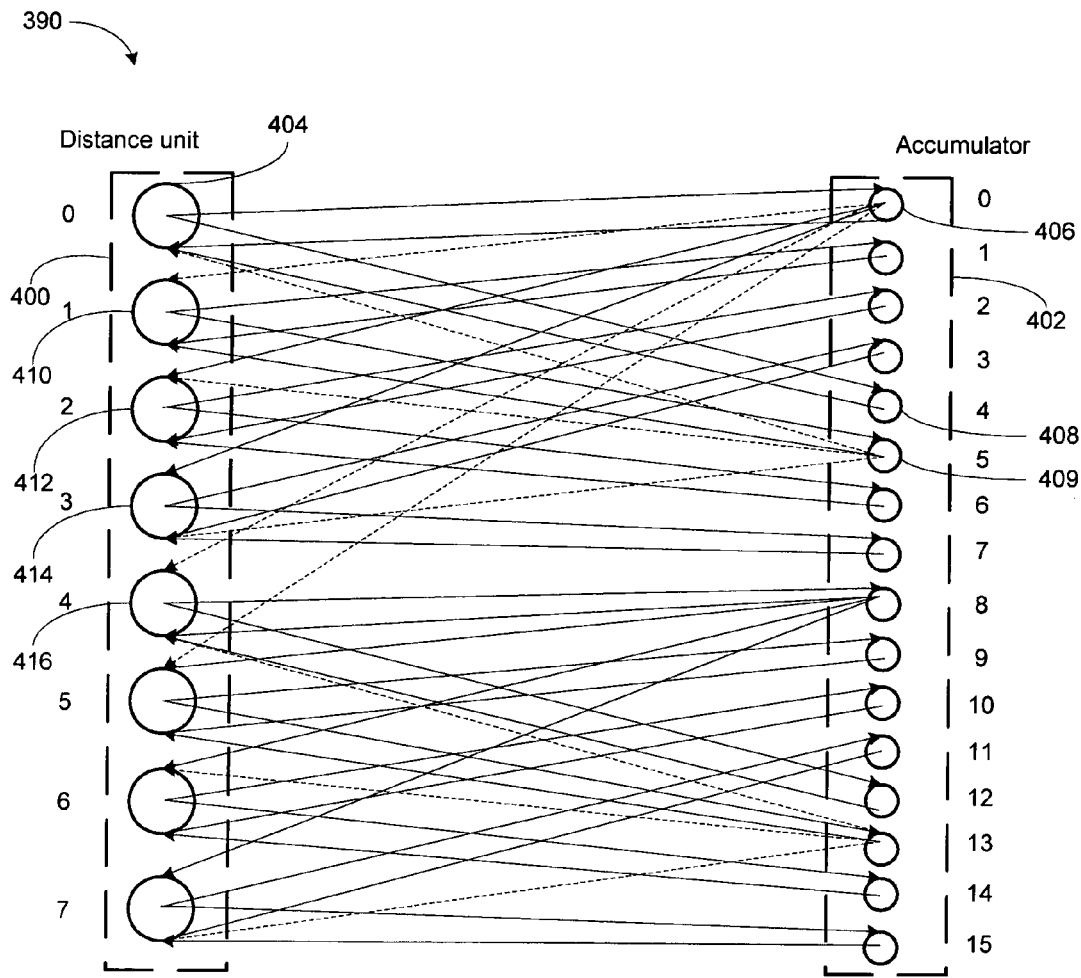

Legend:

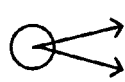 Outgoing connections indicate where the result of this unit goes.
Each connection is a bus consists of 9 individual signals.

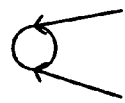 Incoming connections indicate where the initial values of this unit come from.
Each distance unit gets initial values from one or more accumulators.

The position in the graph assigned to an accumulator will determine its outgoing connections. Bad assignment will make the cross over of the connections increase dramatically. It will make the IC layout become more complicate.

*FIG. 9*

Table 1.

| convolution | cck0 | cck1 | cck2 | cck3 | cck4 | cck5 | cck6 | cck7 |
|---|---|---|---|---|---|---|---|---|
| cw0x | ch0 | | | | | | | |
| cw1x | ch1 | ch0 | | | | | | |
| cw2x | ch2 | ch1 | ch0 | | | | | |
| cw3x | ch3 | ch2 | ch1 | ch0 | | | | |
| cw4x | ch4 | ch3 | ch2 | ch1 | ch0 | | | |
| cw5x | ch5 | ch4 | ch3 | ch2 | ch1 | ch0 | | |
| cw6x | ch6 | ch5 | ch4 | ch3 | ch2 | ch1 | ch0 | |
| cw7x | ch7 | ch6 | ch5 | ch4 | ch3 | ch2 | ch1 | ch0 |

*Table 1*

Table 2.

| convolution | cck0 | cck1 | cck2 | cck3 | convolution | cck4 | cck5 | cck6 | cck7 |
|---|---|---|---|---|---|---|---|---|---|
| cw0x | ch0 | | | | | | | | |
| cw1x | ch1 | ch0 | | | | | | | |
| cw2x | ch2 | ch1 | ch0 | | | | | | |
| cw3x | ch3 | ch2 | ch1 | ch0 | | | | | |
| cw4-1 | ch4 | ch3 | ch2 | ch1 | cw4-2 | ch0 | | | |
| cw5-1 | ch5 | ch4 | ch3 | ch2 | cw5-2 | ch1 | ch0 | | |
| cw6-1 | ch6 | ch5 | ch4 | ch3 | cw6-2 | ch2 | ch1 | ch0 | |
| cw7-1 | ch7 | ch6 | ch5 | ch4 | cw7-2 | ch3 | ch2 | ch1 | ch0 |

*Table 2*

HARDWARE IMPLEMENTATION OF MAXIMUM LIKELIHOOD SEQUENCE ESTIMATION FOR WIRELESS RECEIVERS

REFERENCE TO PRIOR APPLICATION

This application claims the benefit of a previously filed U.S. Provisional Application No. 60/396,528 filed on Jul. 16, 2002, and entitled "HARDWARE IMPLEMENTATION OF MAXIMUM LIKELIHOOD SEQUENCE ESTIMATION FOR WIRELESS RECEIVERS'.

BACKGROUND OF THE INVENTION

1. Field of the Invention

The present invention relates generally to the field of wireless receivers and particularly to a method and apparatus for hardware implementation of maximum likelihood sequence estimation for wireless receivers under multi-path communication channels.

2. Description of the Prior Art

As computers have gained enormous popularity in recent decades, so have networking the same, allowing for access of files by one computer from another. More recently and with the advent of wireless communication, remote and wireless networking of computers is gaining more and more notoriety among personal users, small and large business owners, factory facilities and the like.

With regard to the wireless networking of personal computers including laptops, a particular modem, namely modems adapted to the IEEE 802.11b industry standard, are commonly employed. That is, an antenna is placed inside or nearby the personal computer and an RF chip receives signal or data through the antenna and an analog-to-digital converter, typically located within the personal computer (PC), converts the received signal to baseband range. Thereafter, a baseband processor is employed to process and decode the received signal to the point of extracting raw data, which may be files transferred remotely and wireless, from another PC or similar equipment with the use of a transmitter within the transmitting PC.

There are several prior art apparatus and techniques for implementing 802.11b modem receivers, however, such prior art have not successfully utilized the fullest potential of the 802.11b modem. For example, the maximum rate of this type of modem device is 11 Mbits/sec. but in the presence of multipath, use of current prior art methods and apparatus does not allow for reception of data at such rates. In fact, successful reception of data under multipath conditions currently takes place at rates equivalent to 5.5 Mbits/sec.

Furthermore, in areas other than open locations, such as smaller office cubicles located within the inter structure of a building, prior art receivers are known to only operate at rates lower than that of the maximum operational rate of the modem, such as 11 Mbits/sec., thus preventing a user from receiving files from another PC at optimal rates. This is generally due to the prior art techniques' limitations in operating within multipath conditions, which occur mostly in closed areas, such as those mentioned hereinabove. Multipath affects are shown to degrade the detection of data when using prior art techniques and methods.

In light of the foregoing, it is desirable to develop a receiver for receiving 802.11b modem signals accurately and in the presence of multipath yet at maximum rates achievable by the modem. Additionally, the presence of multipath should be mitigated in a cost-effective way without adding considerable complexity to the hardware resources employed in receiving the modem signals.

SUMMARY OF THE INVENTION

Briefly, an embodiment of the present invention includes a coding/decoding trellis structure circuit included in a maximum likelihood sequence estimator (MLSE) sub-receiver having one or more distance calculation units (distus) responsive to equalized data generated by said MLSE sub-receiver from wireless transmission of transmitted data, said distu further responsive to MLSE codewords for processing the same, said equalized data including one or more equalized data chips and each of said MLSE codewords including one or more MLSE codeword chips, each of said distus for processing an equalized data chip and an MLSE codeword chip to generate a chip output, said distu for using said chip output to generate distance measures, a distance measure being the distance between said equalized data and said MLSE codeword. The coding/decoding trellis structure circuit further including one or more accumulator devices responsive to said chip output and said distance measures for storing the same for use by said one or more distus. The coding/decoding trellis structure circuit further including one or more comparator devices responsive to said chip output and said distance measures for processing the same to generate a decoded equalized data, said MLSE sub-receiver using said decoded equalized data to generate a decoded transmitted data.

The foregoing and other objects, features and advantages of the present invention will be apparent from the following detailed description of the preferred embodiments which make reference to several figures of the drawing.

IN THE DRAWINGS

FIG. 8 shows diagrams outlining implementation of the coding/decoding trellis structure circuit at 4 distance calculation units (distu) 310-316, in accordance with an embodiment of the present invention.

FIG. 9 shows a diagram of an optimized arrangement of computational elements and accumulator devices, in accordance with an embodiment of the present invention.

Table 1 shows a sequence of operations for constructing the codewords optimally, in accordance with an embodiment of the present invention.

Table 2 shows further optimization of codebook construction, in accordance with an embodiment of the present invention.

DETAILED DESCRIPTION OF THE PREFERRED EMBODIMENTS

Figure 1:
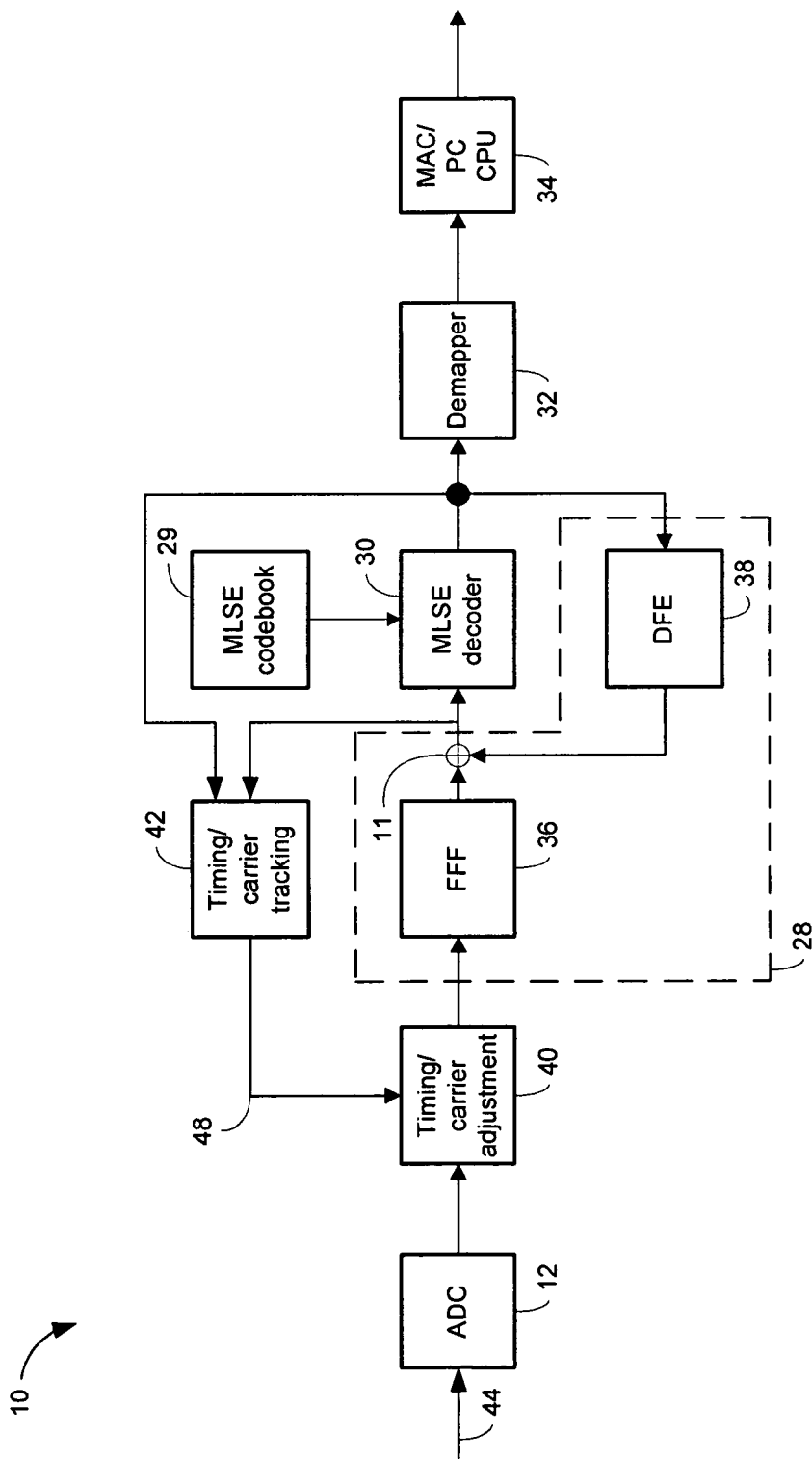
FIG. 1 shows a maximum likelihood sequence estimator (MLSE) receiver system 10 in accordance with an embodiment of the present invention.

Referring now to FIG. 1, a maximum likelihood sequence estimator (MLSE) receiver system 10 is shown to include an analog-to-digital converter (ADC) circuit 12, a timing carrier/adjustment circuit 40, a timing/carrier tracking circuit 42, an MLSE equalizer device 28, an MLSE decoder device 30, an MLSE codebook storage location 29 for storing codebooks, a demapper circuit 32 and a computer central processing unit (CPU) 34. The MLSE equalizer device 28 includes a feedforward (fractionally spaced) filter (equalizer) (FFF) circuit 36 and a decision feedback equalizer (DFE) circuit 38 and a summation junction 11 for adding the output of the circuits 36 and 38.

The MLSE decoder device 30, the MLSE equalizer device 28, and the MLSE codebook storage location 29 are collectively referred to herein as an MLSE sub-receiver. While a brief discussion will be presented in connection with the remainder of the circuits/devices enumerated hereinabove, the operation of which is generally known to those skilled in the art, emphasis will be placed on the MLSE decoder device 30, the MLSE codebook and some portions of the MLSE equalizer device 28, i.e. the MLSE sub-receiver. The remaining portions of the MLSE equalizer device 28, such as the equalizer training circuit are further discussed in a U.S. patent application Ser. No. 10/402,710 entitled "SYMBOL-BASED DECISION FEEDBACK EQUALIZER (DFE) OPTIMAL EQUALIZATION METHOD AND APPARATUS WITH MAXIMUM LIKELIHOOD SEQUENCE ESTIMATION FOR WIRELESS RECEIVERS UNDER MULTIPATH CHANNELS", filed on Mar. 28, 2003, the inventors of which are Thomas Edward Pare, Chien-Cheng Tung, and Cedric Choi, the disclosure of which is herein incorporated by reference in its entirety.

As shown in FIG. 1, the ADC circuit 12 is shown to receive a signal, a receiver signal 44, the ADC circuit 12 converts the receiver signal 44 from analog to digital form and couples the latter to the timing/carrier adjustment circuit 40. The latter additionally receives a timing/phase correction signal 48 that it uses for adjusting the timing and phase of the output of the ADC circuit 12. The operation of the timing/carrier adjustment circuit 40 and the timing/carrier tracking circuit 42 is well understood by those of ordinary skill in the art. Ultimately, the output of the timing/carrier adjustment circuit 40 is equalized by the MLSE equalizer 28, as discussed in the U.S. patent application referenced hereinabove.

The output of the MLSE equalizer device 28 is provided to the MLSE decoder 30 for decoding the output of the device 28 with the aid of the contents of the MLSE codebook storage location 29. The demapper 32 performs the function of bit mapping or data conversion wherein data is converted to actual '1's and '0's (symbol to data conversion) as in the state in which data was initially transmitted to the receiver system 10. The output of the demapper circuit 32 is provided to the Central Processing Unit of the PC or computer 34 for storage thereof or any other use by the user.

The timing/carrier tracking circuit 42 utilizes the output of the MLSE decoder device 30 and the output of the summation junction 11 to correct/adjust the timing/phase of the MLSE decoder device 30. Accordingly, the circuits 40 and 42 are continuously compensating for any phase and/or timing shifts experienced by the receiver signal 44 resulting from many factors, such as inaccuracies associated with the conversion of the analog format of the signal 44 to digital, phase shifts due to the wireless transfer of the signal 44 from a remotely-located transmitting device, and the like.

The circuits 40 and 42 are generally used to demodulate the receiver signal 44 by performing carrier and timing recovery.

While a particular type of equalizer is referred thereto in this patent document, in alternative embodiment of the present invention, any filter will work so long as a residual channel response is generated, which will be discussed further hereinbelow.

Figure 2:
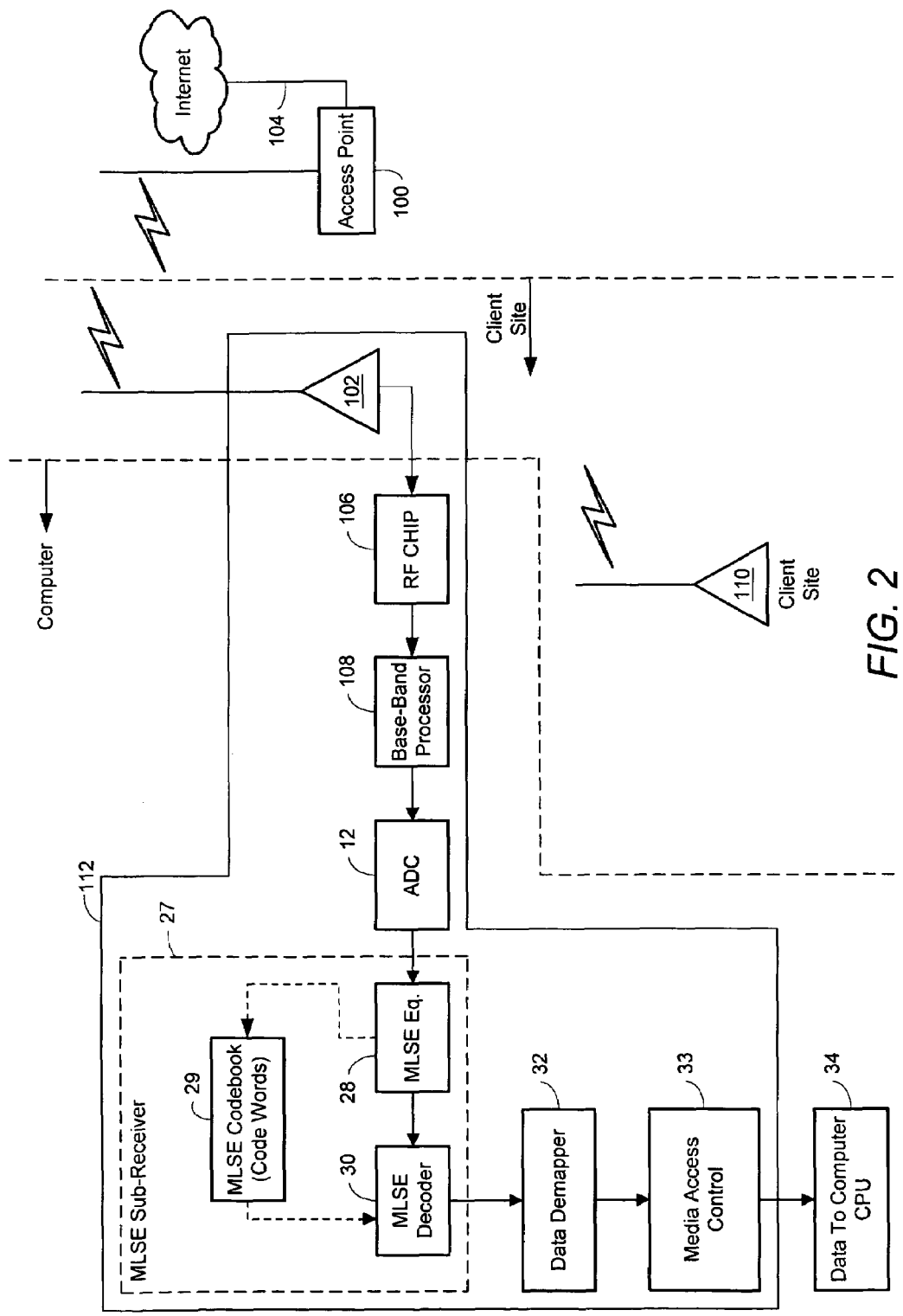
FIG. 2 shows an application of an embodiment of the present invention including further details of the embodiment of FIG. 1.

In FIG. 2, an application of an embodiment of the present invention including further details of the embodiment of FIG. 1 is shown to include an access point 100, which receives input from the Internet or local area network or the intranet, through a fast connection 104. The connection 104 may take on various known forms, such as Digital Subscriber Line (DSL), Ethernet, cable modem, etc. The access point 100 communicates with a client antenna 102. It should be noted that the devices shown to the left of the access point 100 are referred to as a part of the client site, as the client will be receiving information transmitted by the access point 100. The devices shown within the block 112 are components included with the 802.11b modem utilized for wireless networking by the embodiment of FIG. 2. The access point 100 is remotely located to the client site. An example of an access point 100 is a base station. An example of a client site is a PC. While not shown, the access point 100 includes circuits/devices similar to that shown within the block 112.

In FIG. 2, devices shown to the left of the client antenna 102 are considered either within or somehow in close proximity to a PC or computer or any communications device capable of including the same.

The client antenna 102 is connected to an Radio Frequency (RF) chip 106, the latter for receiving signals in the RF range and coupling the same onto a baseband processor device 108 for conversion of the received RF signal to baseband. Signals within the baseband range are far easier to process than at RF ranges. The baseband processor device 108 is coupled to the ADC circuit 12 for conversion of the baseband signal to digital format, as discussed relative to FIG. 1.

In FIG. 2, the output of the ADC circuit 12 is shown coupled to the input of the MLSE equalizer device 28. The device 28 and the device 30 and the MLSE codebook (or codewords) storage location 29 collectively comprise the MLSE sub-receiver 27. The codebook storage location 29 stores codewords comprising a codebook generated by the device 28 and provides these codewords to the device 30 for use thereof. It should however be noted that some circuits, as shown in FIG. 1, are intentionally absent in FIG. 2 for the sake of simplicity. Thus, the circuits shown and discussed relative to FIG. 1 that are shown between the ADC circuit 12 and the equalizer device 28 are not shown in FIG. 2.

The equalizer device 28 is shown coupled to the decoder device 30, which is coupled to the data demapper circuit 32. The output of the demapper circuit 32 is shown coupled to a media access control 33 and the latter is connected to the computer CPU 34. The functions of the demapper circuit 32 and the CPU 34 are discussed relative to FIG. 2. The media access control 33 provides high level functions, such as power savings, data rates, system timing, etc.

At this point, a brief discussion of the coding scheme, complementary code keying (CCK), utilized by an 802.11b is in order. Coding is basically a way of inserting redundancy into raw data (the data to be transmitted) in an effort to improve the robustness of communication. This is particularly of significance in wireless systems, such as the 802.11b although communication rate is reduced by the effects of coding.

The 802.11b utilizes quadrature phase shift keying (QPSK) as a modulation scheme for CCK coding. An uncoded QPSK carries two bits per one QPSK chip. The 802.11b modem receiver discussed herein is a single carrier modem receiver.

Generally, a symbol is also referred to as a codeword. Codewords are the ideal data sequences that are sent by the access point 100, in FIG. 2, and would be received by the receiver under perfect channel conditions. All of the possible codewords of a given data rate constitute a complementary code keying (CCK) codebook. For example, at a data rate of 11 Mbits/sec., all of the codewords of this rate make up its codebook. In the present invention, the MLSE equalizer device 28 generates the MLSE codewords or codebook for any given rate.

Eight chips of QPSK are employed by CCK coding to form a symbol at a data rate of 11 Mbits/sec. and eight chips (or eight bits) are sent per symbol at a data rate of 11 Mbits/sec., whereas, four bits per symbol are sent at a data rate of 5.5 Mbits/sec. Yet at the latter rate, while there are four bits/symbol, there are nevertheless eight chips per symbol.

Altogether, there are 256 symbols at 11 Mbits/sec. CCK data rate, whereas, there are altogether 16 symbols at 5.5 Mbits/sec. The exact code sequence of CCK is well defined in a publication by IEEE for Standard 802.11b published in 1999 as a Supplement to IEEE Standard for Information Technology—Telecommunications and Information Exchange Between Systems—Local and Metropolitan Area Network—Specific Requirements—entitled "Part 11: Wireless LAN Medium Access Control (MAC) and Physical Layer Extension in the 2.4 GHz Band".

CCK is a type of block coding. Assuming that the minimum square Euclidean distance (MSED) QPSK is one, the MSED at a data rate of 11 Mbits/sec. using CCK coding is four and the MSED at a data rate of 5.5 Mbits/sec. using CCK coding is eight. The MSED is generally calculated by the equation $\min_{x,y \in C, x \neq y} \|x-y\|^2$, where C is a codebook and x, y are distinct codewords. This is the minimum squared norm of any two codewords. In QPSK, there are four symbols (codewords). Assuming the labeling of the four symbols to be $\{(½, ½), (-½, ½), (-½, -½), (½, -½)\}$, then the equation yields the minimum squared Euclidean distance to be 1.

There is a 1-symbol delay from the decoder device 30 back to the equalizer device 28. After a determination is made by the decoder device 30 as to which particular codeword was sent, the particular codeword is sent back to the device 28 to substract the effect of the previous symbol on the in-coming symbol.

Figure 3:
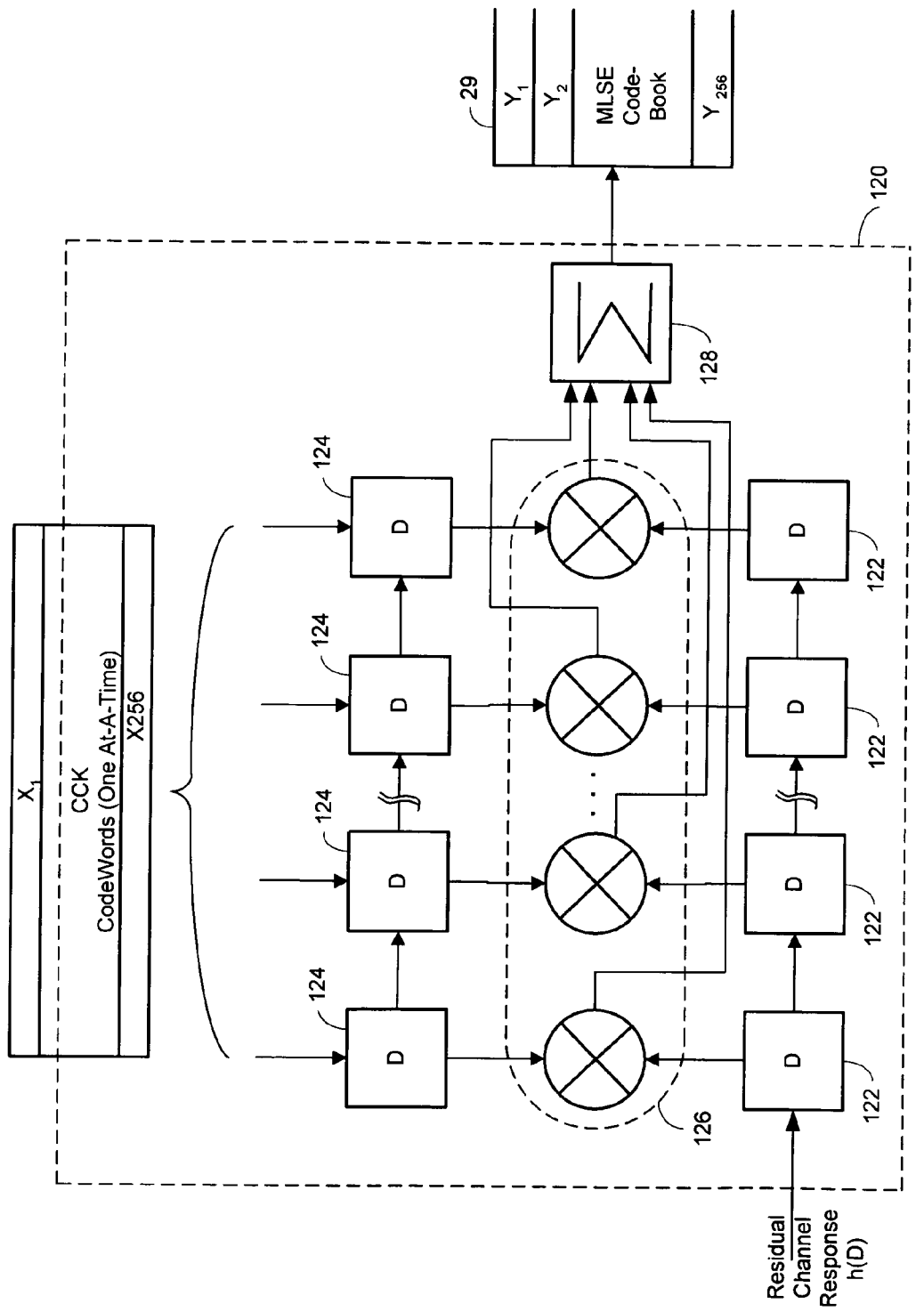
FIG. 3 shows a block diagram of a conventional convolution circuit 120 employed by an embodiment of the present invention for the construction or generation of MLSE codebook.

In FIG. 3, a convolution circuit 120 is shown in accordance with the performance of convolution of the residual channel response h(D), and known codewords, as defined in the Institute of Electrical and Electronics Engineers (IEEE) document indicated hereinabove, in accordance with the data rate being employed. Such a convolution function is represented in mathematical form as Y=X*h(D). Y being the result of the convolution or that which is at 29, X representing the known CCK codewords being input to the delays 124 and * representing a convolution function. The output of the convolution function yields more than 8 terms, only the first eight of which are utilized with the remainder discarded. Thus, the output of the convolution function is truncated to eight as is then the codewords within the MLSE codebook storage location 29. The truncated terms are not needed because for ICI that is longer than one symbol duration (8 chips in the case of CCK), the DFE receiver 38 will remove the ICI after a symbol is decoded and becomes a known value to the receiver.

In FIG. 3, an input, the residual channel response, is shifted into the delays 122, each delay being a unit of time delay and CCK codewords are input to the delays 124 with each delay being a unit of time. The CCK codewords are provided to the delays 124 one-at-a-time. The output of the delays 124 are multiplied by the shifted or delayed residual channel response using the multipliers 126. The output of each of the multipliers 126 is then added utilizing the summer 128. At the summer 128, eight chips are generated. Each time a codeword is multiplied and added with a delayed version of the residual channel response, an MLSE codebook is generated. For each 256 codewords, the residual channel response h(D) is delayed 8 times, or goes through 8 delays 122.

Every CCK codeword causes a MLSE codeword to be generated.

The codewords that are provided to the delays 124 are the ideal codewords for the 802.11b known in advance or predetermined. The codewords are stored in a storage location 29 shown in FIG. 2. That is, they are all of the possible symbols that the in-coming data can represent. The residual channel response is continuously shifted through the delays 122. In 1 Mbits/sec CCK, a total of 256 different MLSE codewords are generated to form a MLSE codebook and ultimately the decoded transmitted data is found by finding the minimum distance (or maximum likelihood) between the various codewords and the received equalized data, as will become obvious shortly.

The convolution circuit of FIG. 3 is a conventional convolution function that is convolving CCK codewords with the residual channel response to produce MLSE codebooks. Each 256 CCK codewords comprise a CCK codebook and each 256 MLSE codewords comprise an MLSE codebook.

In operation, when all of the codewords are passed through the equalizer device 28 (in FIG. 1), the data can be accurately detected by a comparison to all of the different codewords and a determination as to which codeword matches the data. A detected match determines the correct identity of the data. This is perhaps best understood relative to FIG. 4.

Figure 4:
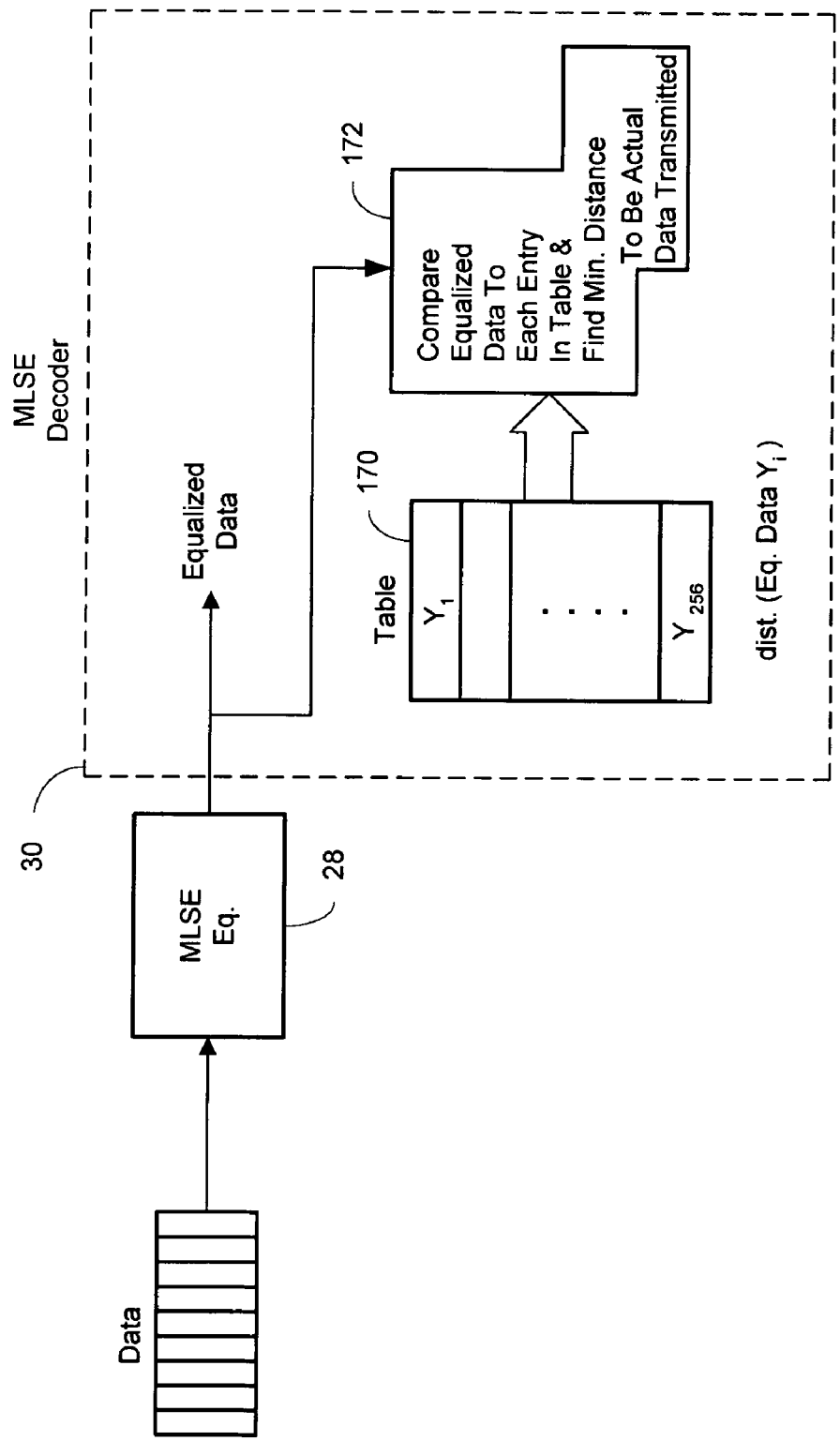
FIG. 4 illustrates further details of the decoder device 30 in accordance with an embodiment of the present invention.

In FIG. 4, the data is shown to be provided as input to the equalizer device 28, which essentially mitigates the data in some known manner to produce an equalized data. The latter is compared at 172 to 256 entries in a table 170. The data received by the equalizer device 28 is in the form of samples of a packet of data. A determination is made as to which of the entries of table 170 closest resembles the equalized data. The entries of the table 170 comprise the MLSE codebook. In essence, 256 distance measures between the data being compared and the codewords is calculated and the minimum distance measure (distance (equalized data, $y_i$)) among all of the distances will be determined because then the data will be presumed to be that of the maximum likelihood (or minimum distance) codeword found. The codeword found will have a particular index associated therewith and according to this index, the decoded transmitted data is determined by referring to the CCK codebook with the index to find the corresponding CCK codeword.

The comparison of 172 is not truly a comparison, rather, it is a calculation of the MSED between the equalized data and the codewords $y_i$ or dist (equalized data, $y_i$). Each of the $y_i$ is a symbol and if the equalized data was represented by equalized data chips $r_1, r_2 \ldots r_8$ and each symbol, for example the first codeword symbol $y_1$ in table 170, was represented by MLSE codeword chips $y_{11}, y_{12}, \ldots y_{18}$, the distance measure for the first symbol would be $y_1 = \|(r_1-y_{11})\|^2 + \|(r_2-y_{12})\|^2 + \ldots + \|(r_8-y_{18})\|^2$ where $r_i$ and $y_{ij}$ are complex numbers and $\| \|$ is a normalization function such that $\|f(\ )\|^2$ is the square of the norm of $f(\ )$. Assume the result of this calculation to be $y_m$, the index m is used to select the corresponding CCK codeword from the CCK codebook and the decoded transmitted data is determined.

It should be noted that while in the embodiment of FIG. 4, MSED is used to determine the decoded transmitted data; maximum likelihood between the equalized data and the codewords in table 170 may be used in alternative embodiments. In yet other embodiments, any distance measure may be used.

A direct computation can show that the complexity of the MLSE decoder is 512 multiplications and 1024 additions for every chip. This number can easily dominate the complexity of the whole receiver system.

Referring now to Table 1 a sequence of operations for optimally constructing the MLSE codewords using codeword groups is shown, in accordance with an embodiment of the present invention. The left most column 140 comprises convolution codeword groups having identifications (ids) cw0x-cw7x. The top row 142 comprises the known CCK codeword chip phases cck0-cck7. The entries in each row of Table 1, headed by a codeword group id in column 140 indicate the residual channel response used in convolution operations to construct the MLSE codeword having the codeword group id. For example, the first four codewords in column 140 are constructed as, $cw0x=cck0*ch0,$ $cw1x=cck0*ch1+cck1*ch0,$ $cw2x=cck0*ch2+cck1*ch1+cck2*ch0,$ $cw3x=cck0*ch3+cck1*ch2+cck2*ch1+cck3*ch0,$ where * represents the multiplication operation.

Codeword chip phase cck0 has four possible values resulting in 4 different results for cw0x. cck1 has 4 possible values and is independent of cck0 resulting in 16 possible values for cw1x. Similarly, cck2 has 4 possible values and is independent of cck0 and cck1 resulting in 64 possible values for cw2x. However, cck3 is dependent on cck0, cck1, and cck2 resulting in only 64 values for cw3x. Similar reasoning shows that codeword group ids cw4x-cw7x have 256 codewords each.

Additionally, due to the rotational symmetry of the 4 angular phases in each codeword group only quarter of the codewords need to be recorded. The remaining three quarters of the codewords may be obtained by simple rotation of each angular phase, when required. Thus the total number of codewords needed in the codeword group ids cw1x-cw7x is 1+4+16+64+64+64+64=293.

Referring now to Table 2, further optimization of the codebook construction operation is shown, in accordance with an embodiment of the present invention. The top row 144 includes the known CCK codeword chip phases cck0-cck7 and the left column 146 includes convolution codeword group ids cw0x-cw3x and cw4-1, cw5-1, cw6-1, and cw7-1. Column 148 includes additional codeword group ids cw4-2, cw5-2, cw6-2, and cw7-2.

Further optimization is achieved by constructing the codeword group ids cw4-1 and cw4-2 where subgroup cw4-1 includes convolution of the first 4 chip phases and subgroup cw4-2 includes convolution of the last 4 chip phases. Thus, cw4-1 includes 16 codewords while cw4-2 has only one codeword.

Similarly, cw5x is split into 2 subgroups cw5-1 and cw5-2, which together have only 16+4 codewords. Thus, the total number of codewords in the subgroup ids becomes 1+4+16+16+(16+1)+(16+4)+(16+16)+(16+16)=106. Such decrease in the required number of codewords reduces the size of the memory required by more than half.

Figure 5:
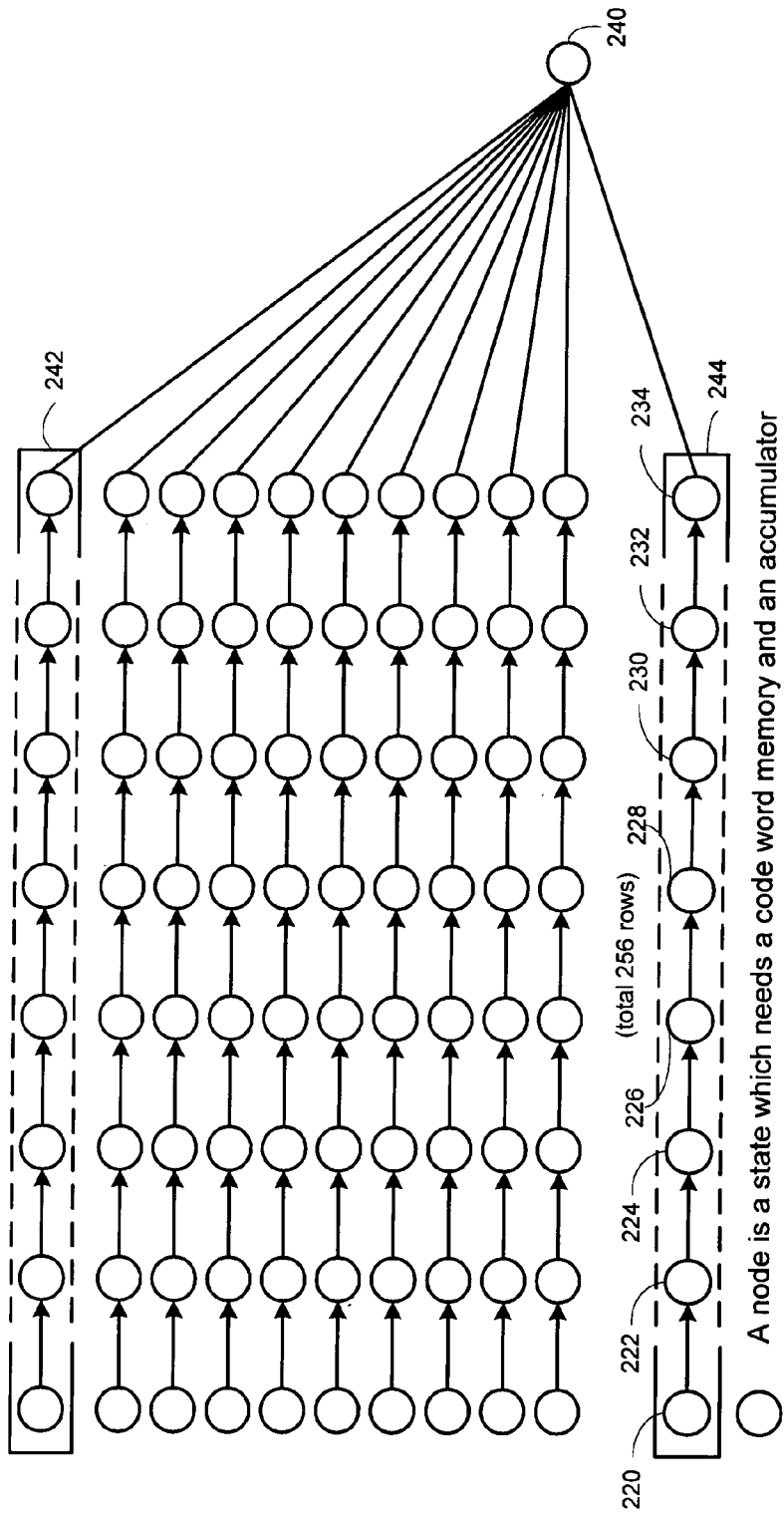
FIG. 5 shows a diagram for implementation of a maximum likelihood sequence estimator (MLSE) algorithm for complementary code keying (CCK) codewords without optimization, in accordance with an embodiment of the present invention.

Referring now to FIG. 5, a diagram for implementation of a maximum likelihood sequence estimator (MLSE) algorithm for complementary code keying (CCK) codewords without optimization is shown in accordance with an embodiment of the present invention. There are 256 codeword sets represented by 256 rows, with a first codeword set 242 and a last codeword set 244, as shown in FIG. 5. Also shown in FIG. 5 is a comparator device at node 240. Each of the codeword sets comprises eight chips or sections. Each codeword set in FIG. 5 includes eight nodes corresponding to the eight chips. For example, codeword set 244 comprises nodes 220-234.

Each node represents a difference operation between the equalized data chip and the MLSE codeword chip and an accumulator device, as described hereinbelow in detail. Each of the arrows, shown in FIG. 5 to be between each pair of adjacent nodes, represents a computational operation performed by a computational element for each row. Accordingly, the dimension of the MLSE algorithm for CCK codewords without optimization is 256×8 requiring 256 accumulator devices and 256 computational elements.

The MLSE algorithm for CCK codewords, shown in FIG. 5, compares the equalized data generated by the MLSE equalizer device 28 to the 256 MLSE codewords without optimization. More specifically, the distance measure between equalized data and each of the codewords is found at each node, as described hereinabove, using the computational elements, i.e. arrows between the nodes, thereby producing 256 outcomes. The 256 outcomes are compared at a comparator device represented by the comparator node 240 to determine the minimum distance measure or the maximum likelihood between the equalized data and the codewords.

To accommodate the delays resulting from comparing 256 outcomes with the equalized data, large buffers are required, which increase the extent of resources used in the implementation of the MLSE algorithm. Optimizing the search for the minimum distance measure between the MLSE codewords and the equalized data greatly increases the efficiency and reduces the cost of implementation, as described in detail hereinbelow.

Figure 6:
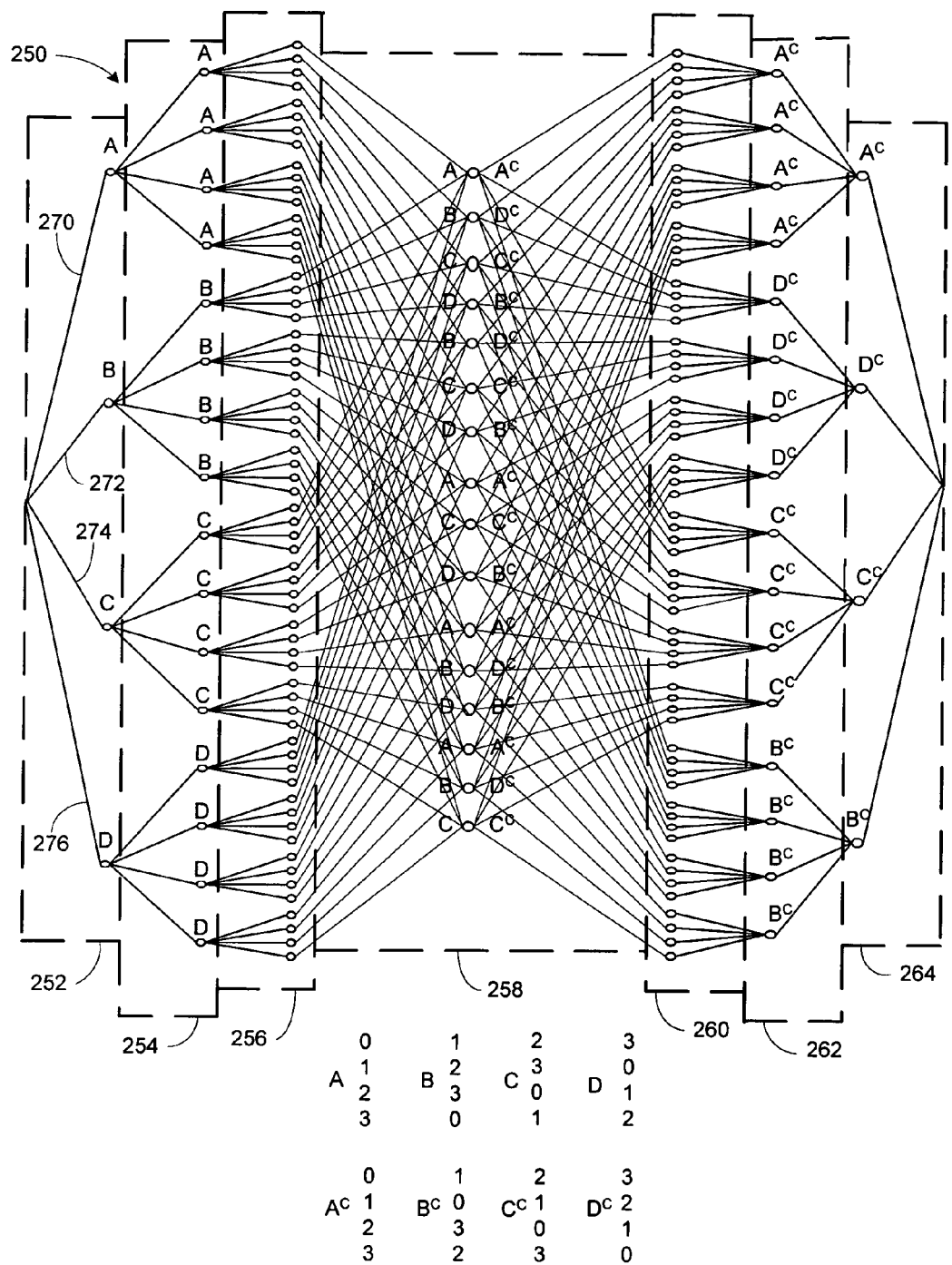
FIG. 6 shows a coding/decoding trellis structure circuit 250, in accordance with an embodiment of the present invention.

Referring now to FIG. 6, a coding/decoding trellis structure circuit 250 is shown, in accordance with an embodiment of the present invention. The coding/decoding trellis structure circuit 250 includes 7 distance calculation units (distus) 252-264. Each distu includes a plurality of computational elements represented by solid lines. For example, distu 252 has four computational units 270-276. Distu 254 has 16 computational elements. Distu 256 has sixty-four computational units, and so on. In an alternative embodiment of the present invention, the coding/decoding trellis structure circuit 250 and the computational elements are implemented in software.

The CCK codeword C at a chip rate of 11 Mbits/sec. is well defined in IEEE standard 802.11b as:

$$C=\{e^{j(\phi 1+\phi 2+\phi 3+\phi 4)}, e^{j(\phi 1+\phi 3+\phi 4)}, e^{j(\phi 1+\phi 2+\phi 4)}, -e^{j(\phi 1+\phi 4)}, e^{j(\phi 1+\phi 2+\phi 3)}, e^{j(\phi 1+\phi 3)}, -e^{j(\phi 1+\phi 2)}, e^{j\phi 1}\},$$

where $C=\{C_0, C_1, C_2, C_3, C_4, C_5, C_6, C_7\}$ and $\phi_1, \phi_2, \phi_3, \phi_4$ take values in the set $\{0, 1, 2, 3\}$. Thus, there are 256 codewords. $C_0$-$C_7$ are the chips or sections in the codeword C.

The trellis structure circuit 250 is found by determining the minimum number of states or nodes between adjacent sections. The minimum number of states or nodes is found by determining the intersection of the coding spaces before and after adjacent sections, as described in detail below.

The coding space before $C_0$ is $\{\phi_1+\phi_2+\phi_3+\phi_4\}$, which takes on values in the set $\{0, 1, 2, 3\}$. The coding space after $C_1$ is $\{\phi_1+\phi_3+\phi_4, \phi_1+\phi_2+\phi_4, \phi_1+\phi_4, \phi_1+\phi_2+\phi_3, \phi_1+\phi_3, \phi_1+\phi_2, \phi_1\}$, which may be reduced to $\{\phi_1, \phi_2, \phi_3, \phi_1+\phi_2+\phi_3+\phi_4\}$. The intersection of the coding space before $C_0$ and after $C_1$ is therefore $\{\phi_1+\phi_2+\phi_3+\phi_4\}$ indicating there are four states between $C_0$ and $C_1$ represented by four nodes in distu 252. That is, the codewords having the same value of $\{\phi_1+\phi_2+\phi_3+\phi_4\}$ correspond to the same state between $C_0$ and $C_1$.

The coding space before $C_1$ and after $C_2$ may be shown to be $\{\phi_2, \phi_1+\phi_3+\phi_4\}$ and $\{\phi_1, \phi_2, \phi_3, \phi_1+\phi_3+\phi_4\}$, respectively, resulting in the intersection thereof to be $\{\phi_2, \phi_1+\phi_3+\phi_4\}$. The intersection indicates 16 states between $C_1$ and $C_2$, as indicated by 16 nodes in distu 254.

The coding space before $C_2$ and after $C_3$ may be shown to be $\{\phi_2, \phi_3, \phi_1+\phi_4\}$ and $\{\phi_1, \phi_2, \phi_3, \phi_1+\phi_4\}$, respectively resulting in the intersection thereof to be $\{\phi_2, \phi_3, \phi_1+\phi_4\}$. The intersection indicates 64 states between $C_2$ and $C_3$, as indicated by 64 nodes in distu 256.

The coding space before $C_3$ and after $C_4$ may be shown to be $\{\phi_2, \phi_3, \phi_1+\phi_4\}$ and $\{\phi_1, \phi_2, \phi_3\}$ respectively resulting in the intersection thereof to be $\{\phi_2, \phi_3\}$. The intersection indicates 16 states between $C_3$ and $C_4$, as indicated by 16 nodes in distu 258.

The coding space before $C_4$ and after $C_5$ may be shown to be $\{\phi_1, \phi_2, \phi_3, \phi_4\}$ and $\{\phi_1, \phi_2, \phi_3\}$, respectively resulting in the intersection thereof to be $\{\phi_1, \phi_2, \phi_3\}$. The intersection indicates 64 states between $C_4$ and $C_5$, as indicated by 64 nodes in distu 260.

The coding space before $C_5$ and $C_6$ may be shown to be $\{\phi_1, \phi_2, \phi_3, \phi_4\}$ and $\{\phi_1, \phi_2\}$, respectively resulting in the intersection thereof to be $\{\phi_1, \phi_2\}$. The intersection shows 16 states between $C_5$ and $C_6$, as indicated by 16 nodes in distu 262.

The coding space before $C_6$ and after $C_7$ may be shown to be $\{\phi_1, \phi_2, \phi_3, \phi_4\}$ and $\{\phi_1\}$, respectively, resulting in the intersection thereof to be $\{\phi_1\}$. The intersection shows four states between $C_6$ and $C_7$, as indicated by four nodes in distu 264.

Figure 7:
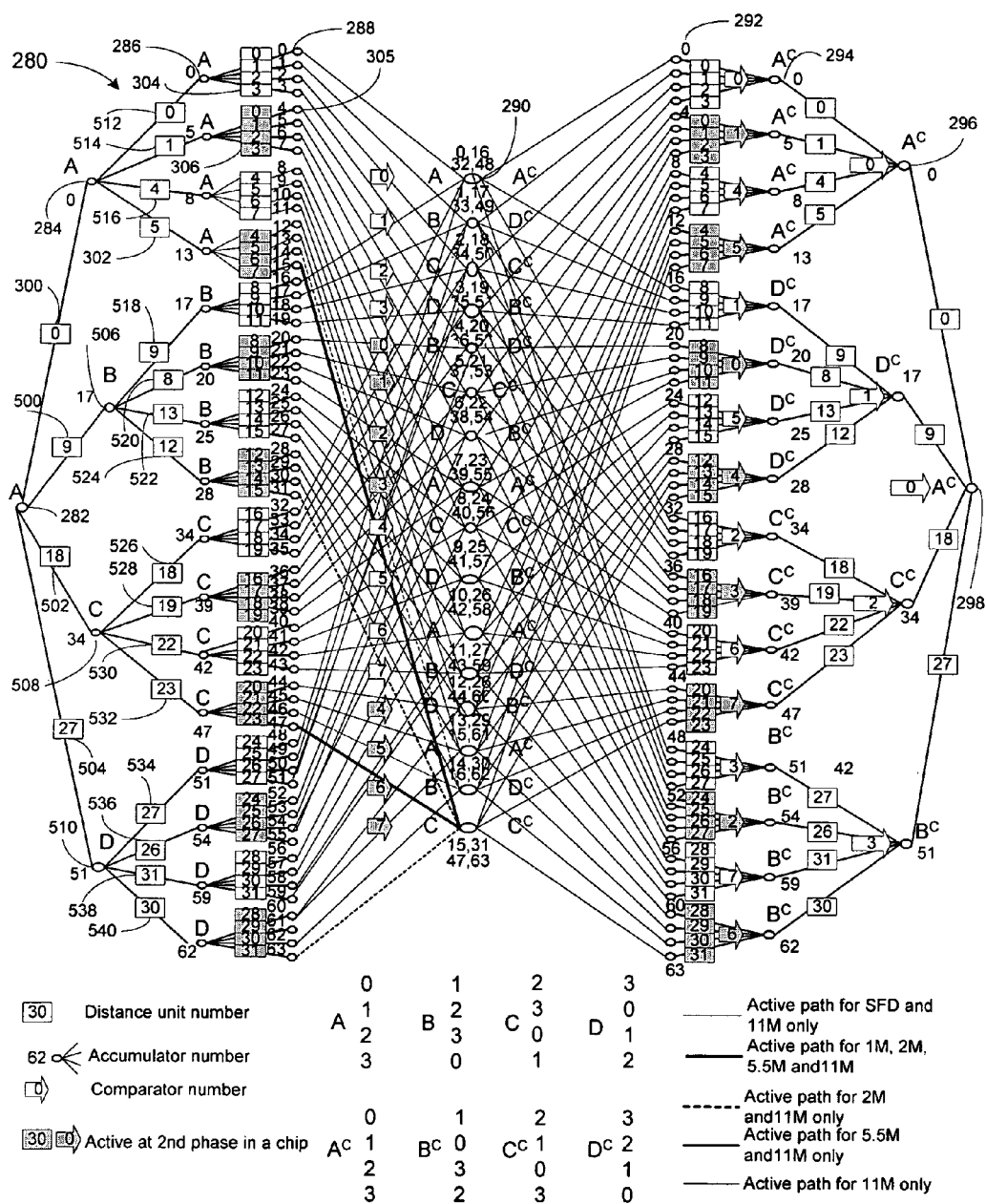
FIG. 7 shows a coding/decoding trellis structure circuit 280 with computational element numbers and accumulator device numbers, in accordance with an embodiment of the present invention

Referring now to FIG. 7, a coding/decoding trellis structure circuit 280 with computational element numbers and accumulator device numbers is shown, in accordance with an embodiment of the present invention. The numbers next to the nodes correspond to the accumulator device numbers. For example, nodes 288 and 305 correspond to the accumulator devices 0 and 4. The numbers inside the squares correspond to the computational element numbers. For example, square 300 corresponds to the computational element 0 while square 302 corresponds to the computational element 5.

The nodes with one incoming path and four outgoing paths, such as 284 and 286, are diversifying nodes and the nodes with four incoming paths and a single outgoing path, such as 294 and 296, are merging nodes. The nodes in the middle of the trellis structure circuit 280, such as node 290, are comparator devices. At the merging and comparator nodes the distances to a plurality of codewords are compared and a minimum distance measure is determined and passed to the next node indicated by the outgoing path. In another embodiment of the present invention, the accumulator and comparator devices are implemented in software.

The sequence of input data comprising 8 sequential chips $C_0$-$C_7$, as discussed hereinabove, is provided to the computational elements in the trellis structure circuit 280 at different phases. More specifically, the value of the first equalized data chip is provided to the computational elements 300, 500, 502, and 504 wherein the first equalized data chip value is subtracted from the first MLSE codeword chip value to calculate the distance measure. The distance measures calculated by the computational elements 300, 500, 502, and 504 are referred to as the first chip output and are stored in the accumulator devices 284, 506, 508, and 510, respectively, as shown in FIG. 7. The second input chip is provided to computational elements 512, 514, 516, 302 and 518-540 wherein distance measure calculations are made by subtracting the second equalized data chip value from the second MLSE codeword chip value. The result of the subtraction is added to the first chip output to generate a second chip output stored in the accumulator devices. Similar calculations are repeated for all the input chips until the eighth chip output is obtained, which is the decoded equalized data. The MLSE decoder device 30 uses the decoded equalized data to determine a maximum likelihood MLSE codeword. The maximum likelihood MLSE codeword is used by the MLSE decoder device 30 to generate the decoded transmitted data, as described hereinabove.

For the fourth input chip, four values from pre-selected accumulator devices are compared at a comparator node to find a minimum distance measure. For example, at the comparator device 290, values from accumulator devices 0, 16, 32, and 48 are compared to find a minimum distance measure. The minimum distance measure is stored in the codeword memory location. For each of the 5th, 6th, 7th, and 8th chips, a comparison and merge is added to distance calculations and accumulations. For the 8th chip, the minimum distance measure is found and a decoded equalized data is obtained by finding the path whose accumulated value corresponds to the minimum distance measure. The decoded equalized data includes the minimum distance measure.

In an alternative embodiment of the present invention, the coding/decoding trellis structure circuit 280 determines the decoded equalized data on-the-fly (or in real-time).

Another advantage of the trellis structure circuit 280 is the reduction in hardware resources employed therein. More specifically, there are 32 computational elements used in the trellis structure circuit 280, as indicated by the number of squares that are used for processing 64 codewords. The codewords are stored in the codeword memory locations of each of the 64 nodes.

To achieve such reductions in hardware resources, computational elements process the codewords in two phases. In the first phase, computational elements represented by nonshaded squares, such as 304, process 31 codewords and in the second phase the same computational elements represented by shaded squares, such as 306, process the remaining 31 codewords. Typically, the trellis structure circuit 280 operates at a chip rate of 11 MHz and within 4-clock cycles.

Referring now to FIG. 8, diagrams outlining implementation of the coding/decoding trellis structure circuit at 4 distance calculation units (distus) 310-316 are shown, in accordance with an embodiment of the present invention. Distus 310-316 correspond to distus 252-258 described in FIG. 6. At the distu 310 five MLSE codewords b00, b10, b20, b40, and b41 are multiplexed at the multiplexer 318. Equalized data 320 and 322, representing in-phase and quadrature parts, respectively, are provided to the distu 310 and combined therein with the multiplexed codewords, one codeword at a time, at the summation junction 324. Subsequently, absolute value (ABS) of the output of the summation junction 324 is calculated at the ABS junction 326 to generate the ABS output.

Distu 310 also receives input from one or more accumulator device 330. The input of the accumulator device 330 is combined with the ABS output at the summation junction 328 to produce the output absacc 332, which is transferred to the accumulator devices. Distu 310 comprises 4 computational elements 0, 9, 18, and 27 shown in the trellis structure 280 of FIG. 7. When the output absacc 332 is sent to the accumulator device 0 located at node 288, distu 310 selects the value cx0 from the accumulator device 0, as indicated by the control signal 311. On the other hand, when the output absacc 332 is sent to the accumulator device 4 located at node 305, distu 310 selects the value cx1 from accumulator device 4, as indicated by the control signal 313.

Similar operations are performed for the implementation of the trellis structure circuit 280 at the three distu 312-316. At distu 312 and distu 314 four codewords and at distu 316 three codewords are multiplexed and subsequently combined with the equalized data.

Referring now to FIG. 9, a diagram of an optimized arrangement 390 of the computational elements and accumulator devices is shown, in accordance with an embodiment of the present invention. Shown in FIG. 9 are eight computational elements 400 on the left side and sixteen accumulator devices 402 on the right side of the diagram. The paths between each computational element and each accumulator device are shown using solid and broken lines. For example, computational element 404 is linked to the accumulator devices 406 and 408 and accumulator device 406 is linked to the computational elements 404, 410, 412, 414, and 416. Such connections may also be noticed in the trellis structure circuit 280 shown in FIG. 7. For example, the output of the computational element 404, shown on the trellis structure circuit 280 by squares numbered 0, is transferred to the accumulator devices 406 and 408, shown on the trellis structure circuit 280 by circles numbered 0 and 4. Analogously, computational element 404 receives input from accumulator devices 406, 408, and 409, shown on the trellis structure circuit by circles numbered 0, 4, and 5, respectively.

The dashed arrows on the optimized arrangement diagram 390 indicate the computational elements causing additional crossovers. For example, the output of the accumulator device 0 is transferred to the computational elements 0, 1, 4, and 5 to perform the computation of the 2nd chip indicated as node 284 in FIG. 7. Further, the output of the accumulator device 0 is transferred to the computational elements 0, 1, 2, and 3 to perform the computation of the 3rd chip indicated as node 286 in FIG. 7.

The optimal arrangement shown in FIG. 9 minimizes the crossover of connections between the computational elements and accumulator devices thereby minimizing complexity of the hardware resources, such as the integrated circuit (IC) layout, used in the design of the coding/decoding trellis structure circuit.

Figure 10:
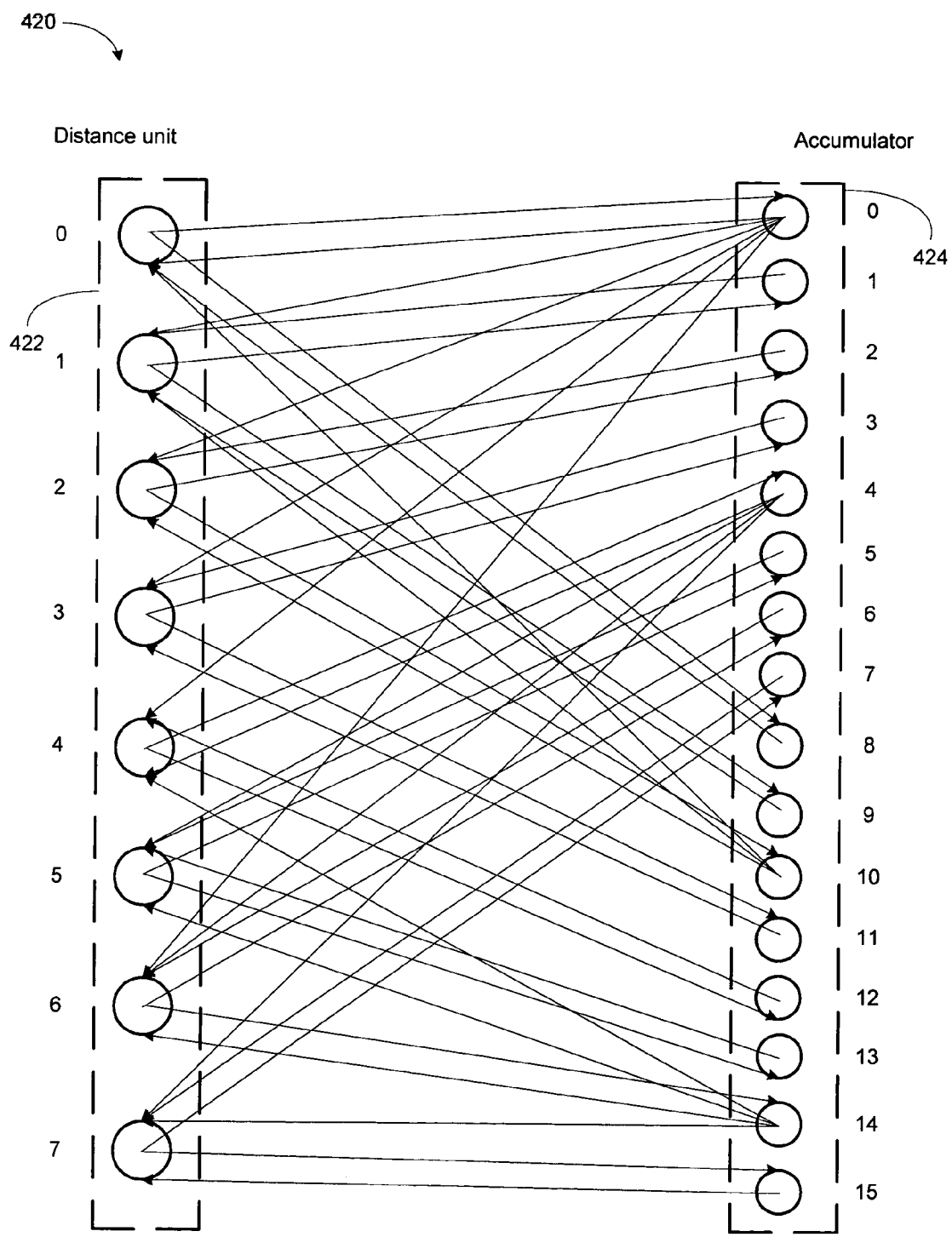
FIG. 10 shows a diagram of a sub-optimized arrangement of computational elements and accumulator devices, in accordance with an embodiment of the present invention.

Referring now to FIG. 10, a diagram of a sub-optimized arrangement 420 of the computational elements and accumulator devices is shown, in accordance with an embodiment of the present invention. Shown in FIG. 10 are a plurality of eight computational elements 422 on the left side and a plurality of sixteen accumulator devices 424 on the right side of the diagram. In the sub-optimized arrangement shown in FIG. 10, the number of crossovers of the connections has increased considerably compared to the number of crossovers in the optimal arrangement shown in FIG. 9. Accordingly, the sub-optimized arrangement diagram of FIG. 10 requires considerably more hardware resources such as IC layout for generating the same outcome as the optimal arrangement diagram of FIG. 9.

Thus, the present invention allows the maximum performance of the 802.11b to be utilized and optimizes performance thereof by mitigating the effects of multi-path and/or inter-chip interference with minimum hardware cost.

Although the present invention has been described in terms of specific embodiment, it is anticipated that alterations and modifications thereof will no doubt become apparent to those more skilled in the art. It is therefore intended that the following claims be interpreted as covering all such alterations and modification as fall within the true spirit and scope of the invention.

What is claimed is:

1. A coding/decoding Trellis structure circuit included in a maximum likelihood sequence estimator (MLSE) sub-receiver comprising:

one or more distance calculation units (distus) responsive to equalized data generated by said MLSE sub-receiver from wireless transmission of transmitted data, said distu further responsive to MLSE codewords for processing the same, said equalized data including one or more equalized data chips and each of said MLSE codewords including one or more MLSE codeword chips, each of said distus for processing an equalized data chip and an MLSE codeword chip to generate a chip output, said distu for using said chip output to generate distance measures, a distance measure being the distance between said equalized data and said MLSE codeword;

one or more accumulator devices responsive to said chip output and said distance measures for storing the same for use by said one or more distus; and one or more comparator devices responsive to said chip output and said distance measures for processing the same to generate a decoded equalized data, said MLSE sub-receiver using said decoded equalized data to generate a decoded transmitted data.

2. A coding/decoding trellis structure circuit as recited in claim 1 further including codeword memory locations for storing said MLSE codewords.

3. A coding/decoding trellis structure circuit as recited in claim 1 wherein said distu including computational elements for processing said MLSE codewords to generate said chip output and said distance measure.

4. A coding/decoding trellis structure circuit as recited in claim 1 for comparing said distance measures to determine a maximum likelihood MLSE codeword, said MLSE sub-receiver using said maximum likelihood MLSE codeword to generate said decoded transmitted data.

5. A coding/decoding trellis structure circuit as recited in claim 1 wherein said distu for adding a plurality of said chip output to generate said distance measure.

6. A coding/decoding trellis structure circuit as recited in claim 3 wherein said computational elements process said MLSE codewords in two phases to reduce the hardware resources used in said coding/decoding trellis structure circuit.

7. A coding/decoding trellis structure circuit as recited in claim 2 wherein the number of said accumulator devices between said two adjacent MLSE codeword chips being determined by the intersection of coding space before and after said two adjacent MLSE codeword chips.

8. A coding/decoding trellis structure circuit as recited in claim 4 wherein said comparator devices for comparing said distance measures to generate a minimum distance measure, said decoded equalized data including said minimum distance measure.

9. A coding/decoding trellis structure circuit as recited in claim 1 wherein a plurality a said MLSE codewords being multiplexed at said distu for processing said plurality of said MLSE codewords with said equalized data.

10. A coding/decoding trellis structure circuit as recited in claim 3 wherein said chip output is transferred from said accumulator device to a plurality of said computational elements.

11. A coding/decoding trellis structure circuit as recited in claim 1 wherein said MLSE codewords being constructed using codeword groups, each of said codeword groups having a plurality of angular phases with rotational symmetry, said rotational symmetry being used to generate a substantially low number of said MLSE codewords.

12. A coding/decoding trellis structure circuit as recited in claim 7 wherein the number of said accumulator devices between the $0^{th}$ codeword chip and the $1^{st}$ codeword chip is 4, the number of said accumulator devices between the $1^{st}$ and $2^{nd}$ codeword chips is 16, the number of said accumulator devices between the $2^{nd}$ and $3^{rd}$ codeword chips is 64, the number of said accumulator devices between the $3^{rd}$ and $4^{th}$ codeword chips is 16, the number of said accumulator devices between the $4^{th}$ and $5^{th}$ codeword chips is 64, the number of said accumulator devices between the $5^{th}$ and $6^{th}$ codeword chips is 16, the number of said accumulator devices between the $6^{th}$ and $7^{th}$ codeword chips is 4.

13. A coding/decoding trellis structure as recited in claim 12 wherein the intersection of the coding space between the $0^{th}$ and $1^{st}$ chips includes 4 states, the intersection of the coding space between the $1^{st}$ and $2^{nd}$ chips includes 16 states, the intersection of the coding space between the $2^{nd}$ and $3^{rd}$ chips includes 64 states, the intersection of the coding space between the $4^{th}$ and $5^{th}$ chips includes 64 states, the intersection of the coding space between the $5^{th}$ and $6^{th}$ chips includes 16 states, the intersection of the coding space between the $6^{th}$ and $7^{th}$ chips includes 4 states.

* * * * *

UNITED STATES PATENT AND TRADEMARK OFFICE
CERTIFICATE OF CORRECTION

| | | |
|---|---|---|
| PATENT NO. | : 7,248,650 B1 | Page 1 of 1 |
| APPLICATION NO. | : 10/454883 | |
| DATED | : July 24, 2007 | |
| INVENTOR(S) | : Chien-Cheng Tung | |

It is certified that error appears in the above-identified patent and that said Letters Patent is hereby corrected as shown below:

Col. 6, line 37; "In 1 Mbits/sec CCK" should read --In 11Mbits/sec CCK--.

Col. 13, line 22; "a plurality a said MLSE" should read --a plurality of said MLSE--.

Signed and Sealed this

Eleventh Day of September, 2007

JON W. DUDAS
*Director of the United States Patent and Trademark Office*